(12) United States Patent
Cheney et al.

(10) Patent No.: US 7,465,468 B1
(45) Date of Patent: Dec. 16, 2008

(54) FROZEN FOOD PRODUCT

(75) Inventors: Paul Edward Cheney, Wilp (NL); Andrew Russell, Auckland (NZ)

(73) Assignee: Good Humor-Breyers Ice Cream, division of Conopco, Inc., Green Bay, WI (US)

( * ) Notice: Subject to any disclaimer, the term of this patent is extended or adjusted under 35 U.S.C. 154(b) by 0 days.

(21) Appl. No.: 09/600,788

(22) PCT Filed: Dec. 23, 1999

(86) PCT No.: PCT/EP98/08552

§ 371 (c)(1), (2), (4) Date: Feb. 13, 2001

(87) PCT Pub. No.: WO99/37164

PCT Pub. Date: Jul. 29, 1999

(30) Foreign Application Priority Data

Jan. 22, 1998 (GB) ................................ 9801410.3

(51) Int. Cl.
*A23G 9/00* (2006.01)
(52) U.S. Cl. .................... 426/101; 426/565; 426/515; 426/516; 426/524
(58) Field of Classification Search ............... 426/565, 426/101, 515, 516, 524
See application file for complete search history.

(56) References Cited

U.S. PATENT DOCUMENTS

| | | | | |
|---|---|---|---|---|
| 4,704,873 A | * | 11/1987 | Imaike et al. ............... | 62/64 |
| 5,126,156 A | * | 6/1992 | Jones ........................ | 426/418 |
| 5,345,781 A | | 9/1994 | Fels et al. | |
| 5,620,732 A | | 4/1997 | Clemmings et al. ......... | 426/565 |
| 5,676,985 A | | 10/1997 | Fletcher et al. ............. | 426/36 |
| 6,082,120 A | * | 7/2000 | Hoffmann et al. ........... | 62/68 |
| 6,228,412 B1 | | 5/2001 | Groux et al. | |
| 6,491,960 B1 | * | 12/2002 | Daniel et al. ............... | 426/565 |

FOREIGN PATENT DOCUMENTS

| | | |
|---|---|---|
| DE | 35 32 071 A1 | 7/1986 |
| EP | 0 351 476 | 1/1990 |
| EP | 0 561 118 A2 | 1/1993 |
| EP | 401512 | 1/1995 |
| EP | 0 713 650 B1 | 5/1996 |
| GB | 2315661 | 2/1998 |
| GB | 2315662 | 2/1998 |
| GB | 2 328 136 * | 2/1999 |
| HU | 190615 B | 9/1986 |
| JP | 58/020156 | 2/1983 |
| WO | WO 90/13571 | 11/1990 |
| WO | WO 92/22581 | 12/1992 |
| WO | WO 96/11586 | 4/1996 |
| WO | WO 96/29896 | 10/1996 |
| WO | WO 97/02343 | 1/1997 |
| WO | WO 98/04146 | 2/1998 |
| WO | WO 98/04147 | 2/1998 |
| WO | WO 98/04148 A2 | 2/1998 |
| WO | WO 98/04148 A3 | 2/1998 |
| WO | WO 98/04699 | 2/1998 |
| WO | WO 98/22591 A2 | 5/1998 |
| WO | WO 98/22591 A3 | 5/1998 |
| WO | WO 96/39878 | 12/1998 |

OTHER PUBLICATIONS

International Search Report (PCT/EP 98/08552), Jun. 29, 1999.
"Antifreeze Proteins And Their Potential Use In Frozen Foods"; Marilyn Griffith and K. Vanya Ewart; Biotechnology Advances, vol. 13, No. 3, pp. 375-402, copyright 1995.
Great Britain Search Report on GB Application No. GB 9801410.3 dated Apr. 28, 1998.
Hungarian Novelty Search Report on Application No. P0100521 dated Oct. 31, 2001.
Patent Abstracts of Japan, Publication No. 58040045 A, date of publication Mar. 1983.
Patent Abstracts of Japan, Publication No. 08098653 A, date of publication Apr. 1996.
U.S. Appl. No. 09/133,623 filed Aug. 13, 1998.

* cited by examiner

*Primary Examiner*—N. Bhat
(74) *Attorney, Agent, or Firm*—Gerard J. McGowan, Jr.

(57) ABSTRACT

A process for the manufacture of a frozen food product comprising antifreeze peptides, wherein the process comprises one or more of the following steps;
(i) a (pre-) freezing) step which is a nucleation dominated freezing process;
(ii) a (post-) compaction step using a screw extruder or a (piston) compactor;

The invention aims at providing the food manufacturer with a greater flexibility for using antifreeze peptide material in frozen food products when aiming to obtain a product with improved recrystallization properties in combination with a good texture. In particular it has been found that the texture of frozen food products containing antifreeze peptides can markedly be improved by carefully controlling its production method.

11 Claims, No Drawings

FROZEN FOOD PRODUCT

This application claims benefit under 35 U.S.C. 371 of PCT/EP98/08552, filed Dec. 23, 1998.

TECHNICAL FIELD OF THE INVENTION

The invention relates to food products containing Anti-freeze peptides (AFPs), in particular to frozen food products containing AFPs.

BACKGROUND TO THE INVENTION

Anti-freeze peptides (AFPs) have been suggested for improving the freezing tolerance of foodstuffs. In particular it has been suggested that some AFPs may be capable of increasing the smooth texture of frozen food products such as ice cream. Up till now, however the use of AFPs has not been applied to commercially available food products. One reason for this is that up till now it has proved difficult to reproducibly produce a frozen food product having the desired texture and eating characteristics.

WO 90/13571 discloses antifreeze peptides produced chemically or by recombinant DNA techniques from plants. The AFPs can suitably be used in food products such as ice cream. No guidelines are given as to how to obtain smooth textures.

WO 92/22581 discloses AFPs from plants, which can be used for controlling ice crystal growth. This document also describes a process for extracting a polypeptide composition from intercellular spaces of plants by infiltrating leaves with an extraction medium without rupturing the plant cells.

Applicants believe that one of the possible reasons for the lack of desired texture in frozen food products containing AFP is that although the AFP is capable of recrystallisation inhibition it is often not capable of avoiding less favourable hard and brittle textures. Applicants believe that one of the explanations for this is that AFPs seem capable of controlling the growth of the ice-crystals. However the presence of AFP may also lead to an adverse effect in that the ice crystals tend to form aggregates leading to hard and brittle products. Thus the texture of the product is unfavourably affected during the manufacturing process.

The present invention therefore aims at defining manufacturing conditions which improve the texture of AFP containing frozen food products.

Surprisingly it has now been found that if the conditions for producing the frozen food material are carefully chosen, this leads to an improved texture. In particular applicants have found that if the production process includes the use of one or more of the following steps;

(i) a (pre-)freezing step which is a nucleation dominated freezing process;

(ii) a (post-)compaction step using a screw extruder or a (piston) compactor;

this leads to aggregation of the ice crystals being minimised and therefore results in more favourable textures of the frozen product, said texture being maintained for prolonged storage periods.

Generally in the freezing of a composition, two distinct phases can be seen: at the onset of the freezing process many small ice crystals are rapidly formed. This phase is called the nucleation phase of the freezing process. Following the nucleation process the remaining part of the composition freezes onto the surface of the nucleates and therewith contributes to the growth of the ice crystals. This phase in the freezing process is called the growth phase. In a growth dominated freezing process most of the composition is frozen during the growth phase, in a nucleation dominated freezing process most of the composition is frozen during the nucleation phase.

Traditional freezing processes for frozen confectionery products for example involves the use of scraped surface heat exchangers whereby the mix to be frozen is subjected to shear during the freezing process. Generally this freezing process takes from 5 to 30 minutes for the product to reach a temperature of −5° C. or lower. In this process initially some nucleation of ice crystals occurs followed by a period wherein ice crystal growth dominates.

Alternative freezing processes, which for example are used for the freezing of water ice involves the low shear or quiescent freezing of the mix, for example by filling a mould and dipping the mould into a cold bath, for example filled with brine. In this process initial nucleation of ice crystals takes place at the surface of the mould, the internal of the product then tend to freeze more slowly in a freezing process dominated by growth.

Applicants have now surprisingly found that the aggregation in AFP containing products can significantly be reduced if a nucleation dominated freezing process is chosen. Such a freezing process is generally characterised by a short freezing time in combination with the formation of small ice crystals. Preferably the freezing process is carried out under low shear or quiescent freezing conditions.

DISCLOSURE OF THE INVENTION

Accordingly, in a first aspect the present invention relates to a process for the manufacture of a frozen food product comprising AFPs, wherein the process comprises one or more of the following steps;

(i) a (pre-)freezing step which is a nucleation dominated freezing process;

(ii) a (post-)compaction step using a screw extruder or a (piston) compactor;

For the purpose of this invention the term AFP has the meaning well-known in the art, see for example "Antifreeze proteins and their potential use in frozen food products", Marilyn Griffith and K. Vanya Ewart, Biotechnology Advances, Vol 13, pp 375-402, 1995.

The present invention aims at providing the food manufacturer with a greater flexibility for using AFP material in frozen food products when aiming to obtain a product with improved recrystallisation properties in combination with a good texture. In particular it has been found that the texture of frozen food products containing AFPs can markedly be improved by carefully controlling its production method.

The invention is based on the finding that if the frozen product is produced by a process involving one or more of the following process steps;

(i) a (pre-)freezing step which is a nucleation dominated freezing process;

(ii) a (post-)compaction step using a screw extruder or a (piston) compactor;

this can lead to an improved texture of the product.

Applicants believe that it is well within the ability of the skilled person to select those freezing methods which result in a nucleation dominated freezing processes.

Preferably when the freezing process is a nucleation dominated freezing process, the freezing process is such that the product reaches a temperature of −5° C. or lower within 30 seconds, preferably in 0.01 to 25 seconds, most preferably in 1 to 15 seconds.

Also preferably when the freezing process is a nucleated dominated freezing process, the freezing process is such that it results in many relatively small crystals, whereby the average size of the crystals is from 0.01 to 20 micrometer, more preferred from 0.01 to 15 micrometer most preferred from 0.01 to 10 micrometer.

For example rapid freezing processes tend to be nucleation dominated. Suitable processes may for example involve:
(a) surface freezing, preferably film freezing onto a cold surface;
(b) freezing of supercooled systems;
(c) decompression freezing;
(d) freezing by very low temperatures'
(e) rapid particulate freezing, preferably condensation freezing.

Other rapid freezing processes will be apparent to the skilled person and are also embraced in the scope of the present invention. Preferably the freezing processes involve no or low shear.

Surface freezing preferably involves the application of a thin film or discrete particles onto a cold surface, optionally followed by removal of the frozen material. Preferably the film or particle thickness is from 0.01 to 5 mm. The cold surface is preferably at a temperature below −15° C., more preferred less than −20° C., most preferred less than −25° C. Suitably the surface can be cooled by applying liquid nitrogen, glycols or methanol. The removal can be done by any suitable means, for example by scraping, therewith producing frozen particles, for example flakes or pellets which can then be further processed. Obviously during further processing care should be taken to avoid substantial melting of the composition, which may result in growth dominated re-freezing.

In a very preferred embodiment surface freezing involves film freezing on a drum freezer which is for example cooled with liquid nitrogen or methanol, followed by removal of the film from the drum freezer.

In a further embodiment of surface freezing a cryogenic plate freezer cooled with liquid nitrogen is used to produce frozen pellets.

An alternative form of surface freezing involves the preparation of a cold core followed by applying the mix to be frozen to the core for example by dipping or spraying, whereby a relatively thin film adheres to the cold core. Advantageously, such a cold core may for example be a very cold (e.g. dipped into liquid nitrogen) ice-cream core where upon a thin film of water-ice comprising AFP is frozen.

Another method of achieving rapid, nucleation dominated freezing is to produce a supercooled system at low temperatures followed by sudden freezing e.g. by applying a shock to the supercooled liquid. The rapid freezing of a supercooled liquid generally is a nucleation dominated freezing process.

Preferably the supercooled liquid has a temperature of at least 1 degree below the melting point, more preferred from 1-20 degrees below the melting point, for example 2-10 degrees below the melting point.

A third method of achieving rapid nucleation dominated freezing is to use decompression freezing. This involves the applying of high pressures to a liquid system while cooling it followed by removing the overpressure. This removal of the pressure then results in a rapid nucleation dominated freezing.

Preferably the pressure to be applied is from 100 to 3000 bar, for example from 200 to 2000, generally from 300 to 1300 bar. The temperature of the product before removing the over-pressure is preferably at least 5 degrees below the melting point at atmospheric pressure, preferably 6-10 degrees below the melting point.

A fourth method of ensuring nucleation dominated freezing is the application of very low temperatures. For example small drops of material to be frozen may be immersed into a fluid freezing medium e.g. liquid hexane or liquid nitrogen. Preferably the freezing temperature for this method is less than −50° C. This method works best for relatively small or thin products to be frozen. Small products are preferably less than 5 grams, more preferred from 0.001 to 3 grams, most preferred 0.01 to 1 gram and may for example be drops of liquid immersed in the freezing medium. Relatively thin products may for example be sheets or thin streams of products, preferably having at least 1 dimension of less than 2 cm, more preferred 0.1 to 0.5 cm.

The product for use in this method may for example be directly immersed into the freezing liquid, alternatively however the products are first contacted with a protective layer e.g. filled into a mould, pumped through a pipe whereby these are contacted with the cooling medium.

A fifth preferred method to freeze food products of the invention involves rapid particulate freezing, preferably condensation freezing. This may for example be achieved by spraying a liquid mix to be frozen into a very cold gaseous environment or into a cooled environment. An especially preferred method for rapidly freezing a liquid into particulates is condensation freezing. Most preferred is the use of techniques which are for example use in the production of artificial snow.

The production of artificial snow is widely described in the literature. Often artificial snow is produced in so called snow cannons whereby the water is frozen by spraying a mixture of water and pressurised air. Preferably the snowmaking takes place in an environment having a temperature of less than −3° C., most preferred −5 to −50° C. and a relative humidity of less than 75%, most preferred less than 50%.

Frozen particulates obtained by this fifth method can vary in size, but generally the number average diameter of the particles will be up to 10 mm, more preferred less than 5 mm. Generally each particulates will comprise multiple aggregated ice-crystals.

The freezing of frozen confectionery products by means of a screw extruder is for example described in: EP 713,650 (Societe des Produits Nestle), EP 410,512 (HMF Krampe & Co et al); EP 561,118 (Milchhof-Eiskrem GmbH et al), EP 351,476 (Goavec S. A. Societe Dite).

Preferably the manufacturing process of the invention involves the use of a screw extruder whereby the extrusion temperature of the frozen product is −8° C. or lower, more preferred from −10 to −25° C., most preferred from −12 to −20° C.

Suitable screw extruders for use in the process of the invention can for example be twin screw extruders such as described for example in EP 561,118. Also single screw extruders may be used. Also extruders may be used which combine more than one function of the ice-cream manufacturing process (see for example EP 713,650).

The conditions under which the screw extruder operates may vary for example depending on the type and size of the extruder used. Applicants believe that it is well within the ability of the skilled person to select those operating conditions such that a favourable quality of the product is obtained. Examples of suitable operating conditions are given in the examples.

Alternatively a compactor may advantageously be used in the manufacturing of frozen food products with AFPs. All suitable compactors such as presses may be used, especially preferred is the use of a piston compactors whereby pressure is applied onto the food products by means of the movement of a piston. Traditionally piston compactors have for example been used in the filling of sausages. Again applicants believe that it is within the ability of the skilled person to select the appropriate operating conditions of the (piston) compactor.

Preferably the invention relates to a process for the manufacture of a frozen food product comprising AFPs, wherein the process comprises the following steps;

(i) a (pre-)freezing step which is a nucleation dominated freezing process; and (ii) a (post-)compaction step using a screw extruder or a (piston) compactor.

The use of a screw extruder or compactor may very advantageously applied to products which have been pre-frozen under such conditions that a particulate (partial) frozen material is produced for example flakes, pellets, powders, extended rods or sheets. For these pre-frozen products the use of screw extruders or (piston) compactors may advantageously lead to the compaction of the particulate material into a more solid structure.

The complete manufacturing process of the frozen products of the invention may comprise further optional steps in addition to pre-freezing and/or screw extrusion or piston compaction. For example the mixing of the ingredients, ageing, pasteurisation, homogenisation, pre-aeration etc. These optional steps can take place in any suitable order.

As described above, one of the characteristics of nucleation dominated freezing process is the formation of many small ice crystals. Applicants have found that the combined use of AFPs as an ingredient and nucleation dominated freezing process leads to a particular advantageous texture of the products to be frozen, said textures being maintained for long storage periods.

Particularly the nucleation dominated freezing process can very advantageously be used for the production of a particulate frozen material. Examples of these are frozen flakes, frozen (small) droplets, frozen powders, pellets, frozen rods and frozen snow. Surprisingly particulate materials formed by the process of the invention have a reduced tendency to aggregation and therefore the free flowing nature of the particulate material can be maintained over storage, even if the storage temperature is relatively high.

Further the applicants have found that the use of a screw extruder or (piston) compactor in the production of AFP containing frozen food products is very advantageous in that it too can lead to very small ice-crystal sizes which can be maintained for long periods of storage.

Preferably the freezing conditions are chosen such that the average size of the ice crystals in the final frozen product is from 0.01 to 20 micrometer, said ice crystal sizes to be maintained in said range upon storage at −10° C. for 3 weeks.

Preferably the average ice crystal size remains less than 15 micrometer, for example less than 12 or even 10 micrometer during storage for 3 weeks at −10° C.

If the freezing process involves a nucleation dominated freezing process in the absence of any compaction process, the frozen product provided may be a particulate food product. If, on the other hand, a screw extruder or a (piston) compactor is used, products may be formed which are homogeneously solid and having no (fine) particulates.

Preferably non-particulate products of the invention have a smallest dimension of more than 2 cm, more preferred more than 2.5 cm, most preferred more than 3 cm.

After freezing the product may be further handled. For example the product may be filled into packages say of 0.05 to 10 liters and then stored. Alternatively the product may be further shaped or formed into the final product. For example the product can be used to the shaped into ice-cream gateaux.

A further advantage of the invention is that when the process used includes post compaction using either a screw extruder or a (piston) compactor, products of the invention generally do not need to be subjected to a hardening step, for example in a hardening tunnel. This advantage has for example been suggested for AFP products in general in U.S. Pat. No. 5,620,732 (Pillsbury).

The process as described in U.S. Pat. No. 5,620,732 however has as a disadvantage that this is not suitable for the production of luxury stick products. These products are traditionally made by extruding and cutting a block of ice-cream, hardening the block, followed by stick insertion and coating for example with chocolate or fruit water ice. If the hardening step is omitted for AFP containing products this leads to problems in the further handling for example during stick insertion or further coating.

Surprisingly applicants have found that the combined use of AFPs and post-compaction with either a screw extruder or (piston) compactor now renders it possible to product luxury stick products without the use of a hardening step.

Frozen food products of the invention may be any food product which can be stored and/or eaten in the frozen state. Examples of frozen food products which may contain AFPs are processed food products such as for example frozen bakery products for example dough, batters, cakes etc., frozen culinary products for example soups, sauces, pizzas, frozen vegetable products such a compote, mashed potato, tomato paste etc.

Applicants have found that the method of the invention is best applicable to food systems which are fluid or liquid prior to freezing. A very preferred food product according to the invention is a frozen confectionery product.

For the purpose of the invention the term frozen confectionery product includes milk containing frozen confections such as ice-cream, frozen yoghurt, sherbet, ice milk and frozen custard; as well as frozen confections which do not typically contain milk such as water ices, sorbet, granitas and frozen fruit purees. Especially preferred products of the invention are ice-cream and water ice.

Frozen products according to the invention may be aerated. For example the level of aeration is more than 50%, more preferably more than 70%, most preferable more than 90%. Generally the level of aeration will be less than 400%, more general less than 300%, most preferred less than 200%. Aeration may for example take place prior or during freezing. If the product is pre-frozen by one or more of the above described nucleation dominated freezing processes then preferably the aeration takes place prior to pre-freezing.

Preferably the level of AFPs in the frozen food product of the invention is from 0.0001 to 0.5 wt % based on the final product.

The AFP for use in products of the invention can be any AFP suitable for use in food products. Examples of suitable sources of AFP are for example given in the above mentioned article of Griffith and Vanya Ewart and in patent applications WO 98/04699, WO 98/04146, WO 98/04147, WO 98/04148 and WO 98/22591.

The AFPs can be obtained from their sources by any suitable process, for example the isolation processes as described in the above mentioned documents.

One possible source of AFP materials is fish. Examples of fish AFP materials are AFGP (for example obtainable from Atlantic cod, Greenland cod and Tomcod), Type I AFP (for example obtainable from Winter flounder, Yellowtail flounder, Shorthorn sculpin and Grubby sculpin), Type II AFP (for example obtainable from Sea raven, Smelt and Atlantic herring) and Type III AFP (for example obtainable from Ocean Pout, Atlantic wolffish, Radiated shanny, Rock gunnel and Laval's eelpout). A preferred example of the latter type is described in WO 97/02343.

Another possible source of AFP material are invertebrates. Also AFPs may be obtained from Bacteria.

A third possible source of AFP material are plants. Examples of plants containing AFPs are garlic-mustard, blue wood aster, spring oat, winter cress, winter canola, Brussels sprout, carrot, Dutchman's breeches, spurge, daylily, winter barley, Virginia waterleaf, narrow-leaved plantain, plantain, speargrass, Kentucky bluegrass, Eastern cottonwood, white oak, winter rye, bittersweet nightshade, potato, chickweed, dandelion, spring and winter wheat, triticale, periwinkle, violet and grass.

Both natural occurring species may be used or species which have been obtained through genetic modification. For example micro-organisms or plants may be genetically modified to express AFPs and the AFPs may then be used in accordance to the present invention.

Genetic manipulation techniques may be used to produce AFPs. Genetic manipulation techniques may be used to produce AFPs having at least 80%, more preferred more than 95%, most preferred 100% homology to the AFPs directly obtained from the natural sources. For the purpose of the invention these AFPs possessing this high level of homology are also embraced within the term "AFPs".

The genetic manipulation techniques may be used as follows: An appropriate host cell or organism would be transformed by a gene construct that contains the desired polypeptide. The nucleotide sequence coding for the polypeptide can be inserted into a suitable expression vector encoding the necessary elements for transcription and translation and in such a manner that they will be expressed under appropriate conditions (for example in proper orientation and correct reading frame and with appropriate targeting and expression sequences). The methods required to construct these expression vectors are well known to those skilled in the art.

A number of expression systems may be utilised to express the polypeptide coding sequence. These include, but are not limited to, bacteria, yeast insect cell systems, plant cell culture systems and plants all transformed with the appropriate expression vectors.

A wide variety of plants and plant cell systems can be transformed with the nucleic acid constructs of the desired polypeptides. Preferred embodiments would include, but are not limited to, maize, tomato, tobacco, carrots, strawberries, rape seed and sugar beet.

For the purpose of the invention preferred AFPs are derived from fish or plants. Especially preferred is the use of fish proteins of the type III, most preferred HPLC 12 as described in our case WO 97/02343. From plants especially the use of AFPs form carrot or grass are preferred.

For some natural sources the AFPs may consist of a mixture of two or more different AFPs.

Preferably those AFPs are chosen which have significant ice-recrystallisation inhibition properties. This can be measured in accordance to Example I.

Preferably AFPs in accordance to the invention provide an ice particle size upon recrystallisation, as measured in accordance to the examples, of less than 20 µm, more preferred from 5 to 15 µm.

Preferably the level of solids in the frozen food product (for example sugar, fat, flavouring etc.) is more than 2 wt %, more preferred from 4 to 70 wt %.

The method of preparing the frozen food product of the invention can be selected from any suitable method for the preparation of frozen food products. The AFPs can generally be added at various stages of the preparation, for example it can be added in the first pre-mix of ingredients or can later be added during a later stage of the preparation process. For some applications it is sometimes preferred to add the AFPs at a relatively late stage of the production process, for example after (partial) pre-freezing of the product.

The freezing process of the invention will generally include the freezing of the composition say to a temperature of less than −2° C., say from −80 to −5° C. If desired, products of the invention do not need to be subjected to low temperatures to avoid ice-crystal growth. Therefore the products may for example be frozen without the need to use low temperatures say less than −25° C. and can also be stored at temperatures which are higher than traditional temperatures to store frozen confectionery products.

Preferably the freezing process involves conditions of low or no shear e.g. found in the freezing of filled moulds dipping, thin film crystallisation, dropping into liquid nitrogen etc.

For some applications it may be advantageous to include a mixture of two or more different AFPs into the food product. One reason for this can for example be that the plant source for the AFPs to be used, contains more than one AFP and it is more convenient to add these, for example because they are both present in the AFP source to be used. Alternatively it may sometimes be desirable to add more than one AFP from different sources.

The invention will now be illustrated by means of the following examples.

EXAMPLE I

Method of determining whether an AFP possesses ice recrystallisation inhibition properties.

Recrystallisation inhibition properties can measured using a modified "splat assay" (Knight et al, 1988). 2.5 µl of the solution under investigation in 30% (w/w) sucrose is transferred onto a clean, appropriately labelled, 16 mm circular coverslip. A second coverslip is placed on top of the drop of solution and the sandwich pressed together between finger and thumb. The sandwich is dropped into a bath of hexane held at −80° C. in a box of dry ice. When all sandwiches have been prepared, sandwiches are transferred from the −80° C. hexane bath to the viewing chamber containing hexane held at −6° C. using forceps pre-cooled in the dry ice. Upon transfer to −6° C., sandwiches can be seen to change from a transparent to an opaque appearance. Images are recorded by video camera and grabbed into an image analysis system (LUCIA, Nikon) using a 20× objective. Images of each splat are recorded at time=0 and again after 60 minutes. The size of the ice-crystals in both assays is compared by placing the slides within a temperature controlled cryostat cabinet (Bright Instrument Co Ltd, Huntington, UK). Images of the samples are transferred to a Quantimet 520 MC image analysis system (Leica, Cambridge UK) by means of a Sony monochrome CCD videocamera. Ice crystal sizing was performed by hand-drawing around ice-crystal. At least 400 crystals were sized for each sample. The ice crystal size was taken as being the longest dimension of the 2D projection of each crystal. The average crystal size was determined as the number average of the individual crystal sizes. If the size at 30-60 minutes is similar or only moderately (less than 10%) increased compared to the size at t=0, and/or the crystal size is less than 20 micrometer, preferably from 5 to 15 micrometer this is an indication of good ice-crystal recrystallisation properties

EXAMPLE II

The following formulation:

15% wt sugar

10% wt skimmed milk powder

10% wt butterfat 0.2% wt locust bean gum 0.2% wt monglyceride 0.01% wt AFP* balance water

* AFP HPLC 12 as described in WO 97/02343 was produced using conventional ice-cream processing equipment. The premix was cooled to 0° C. before passing through a Megatron model MT1-63/3A mixer, operating at 8000 rpm. The mixer had a gap of 0.5 mm between the rotor and stator. An equal volume of air was injected into the premix immediately before the mixing device. This gave an overrun of 90% in the premix.

This aerated premix was frozen by applying a 0.5 mm thickness on a Gerstenberg and Agger pilot cooling drum, having a surface area of 0.2 m², and operating at a rotational speed of 5 rpm. The drum was cooled with liquid Nitrogen. Frozen flakes were removed using a plastic scraping knife after 1 revolution (i.e. after 12 seconds). The flakes had a temperature of -20° C. The flakes were collected, hardened in a blast freezer at -35° C., then stored at -25° C.

The ice-cream flakes were soft and creamy.

The particle size of the ice crystals were determined as in Example I. The ice crystal size was well below 20 micron and remained below 20 micron after storage for 3 weeks at -10° C.

EXAMPLE III

An ice-cream premix of the formulation of Example II was produced using conventional ice-cream processing equipment. The premix was cooled to 0° C. before passing through a Megatron model MT1-63/3A mixer, operating at 8000 rpm and with a gap of 0.5 mm between the rotor and stator. An equal volume of air was injected into the premix immediately before the mixing device. This gave an overrun of 90% in the premix.

The aerated premix was pumped through a plate heat exchanger, whose coolant temperature was controlled to -7° C., a temperature warmer than the metastable limit of -8° C. for the premix. The premix exited the heat exchanger at -6° C.; the melting temperature of the premix was -2° C. No ice was present in the premix, i.e. it was undercooled.

The premix was poured into conventional metal ice-lolly moulds, which were cooled by brine at -35° C. Sticks were inserted into the moulds. After 15 minutes, the frozen ice-cream products were removed from the moulds.

The products were stored at -25° C. The ice-cream products had a soft and creamy texture.

COMPARATIVE EXAMPLE IV

An ice-cream premix of formulation of Example II was produced using conventional ice-cream processing equipment. The premix was cooled to 0° C. before passing through a Megatron model MT1-63/3A mixer, operating at 8000 rpm and with a gap of 0.5 mm between the rotor and stator. An equal volume of air was injected into the premix immediately before the mixing device. This gave an overrun of 90% in the premix.

The aerated premix was frozen in a standard ice-cream scraped surface heat exchanger (Crepaco W104, supplied by APV, operating with a series 80 dasher at a rotational speed of 240 rpm) at a rate of 200 l/hr. The exit temperature was -5° C., after a residence time of 90 seconds. The ice-cream was then hardened in a blast freezer at -35° C., before storage at -25° C.

The ice-cream was found to be hard and brittle.

EXAMPLE V

A liquid premix for the preparation of ice-cream was prepared by mixing:

| Ingredient | % by weight |
| --- | --- |
| Skimmed milk powder | 10.00 |
| sucrose | 13.00 |
| maltodextrin (MD40) | 4.00 |
| Locust bean gum | 0.14 |
| butter oil | 8.00 |
| monoglyceride (palmitate) | 0.30 |
| vanillin | 0.01 |
| AFP** | 0.01 |
| water | balance |

**AFP is carrot AFP prepared as follows (WO 98/2259). Carrots (*Daucus carota* cv Autumn King) were grown in individual pots. When plants were approximately twelve weeks old, they were transferred to a cold room and held at 4° C. in constant light during 4 weeks for cold-acclimation. Plants were watered three times a week. Root extract from cold acclimatised carrots roots was prepared by scrubbing freshly pulled cold acclimatised (as described above) carrots in cold water. The tops wereremoved and the juice extracted employing a domestic juice extractor (Russell Hobbs, model no 9915). The juice was frozen in 1 liter blocks and stored at -20° C. prior to collection for use in ice cream formulations.

The composition was prefrozen to -5° C. and aerated to 100% overrun in a traditional scraped surface heat exchanger.

The composition was further frozen in a single screw extruder having a barrel length of 0.75 m, a diameter of 0.2 m a screw pitch of 0.135 m (2 start) and a screw channel depth of 15 mm.

The throughput was 280 kg/hour, the inlet pressure 7 barg and a constant torque of the screw was 1500 Nm. The output pressure was 8 barg. The screw extruder was cooled such that the extrusion temperature was -12° C.

As a comparison (B) the same product was produced using a conventional scraped surface heat exchanger.

A comparison (C) the same product was produced by the above screw extruder process, whereby the AFP was omitted from the formulation.

The resulting products were stored for 3 weeks at -10° C.

Composition A had a smoother and creamier texture than formulations B and C.

EXAMPLE VI

A liquid premix for the preparation of ice-cream was prepared by mixing:

| Ingredient | % by weight |
| --- | --- |
| Skimmed milk powder | 10.00 |
| sucrose | 13.00 |
| maltodextrin (MD40) | 4.00 |
| Locust bean gum | 0.14 |
| butter oil | 8.00 |
| monoglyceride (palmitate) | 0.30 |
| vanillin | 0.01 |
| AFP (of example V) | 0.01 |
| water | balance |

The liquid mix was continuously aerated at a throughput of 60 liters/hour using a high speed rotor/stator mixer (megatron, Kinematica AG) to an overrun of 100%. the mix temperature was 5° C. and a mixer speed of 1600 rpm was employed. A pressure of 3 barg was maintained within the mixing head.

The aerated mix was then continuously spread as a 0.1 mm film on the surface of a drum freezer cooled with a methanol solution at −28° C. The drum freezer was rotated at a rate of 1 rpm. After one complete revolution the frozen film at −10° C. was remover continuously by means of a scraper blade to form frozen flakes.

The frozen flakes were compressed batch-wise using a piston compression device. The compressed ice cream was extruded through a nozzle and packaged for storage. The ice crystal size distribution of the frozen material was measured as follows: by placing the coverplates smeared with the compositions to be tested within a temperature controlled cryostat cabinet (Bright Instrument Co Ltd, Huntington, UK). Images of the samples are transferred to a Quantimet 520 MC image analysis system (Leica, Cambridge UK) by means of a Sony monochrome CCD videocamera. Ice crystal sizing was performed by hand-drawing around ice-crystal. At least 400 crystals were sized for each sample. The ice crystal size was taken as being the longest dimension of the 2D projection of each crystal. The average crystal size was determined as the number average of the individual crystal sizes.

The average ice crystal size was 5.8 micrometer for the fresh sample with AFP and 7.2 micrometer for the fresh sample with AFP. After storage for 3 weeks at −10° C. the particle size of the sample with AFP was 7.7. micrometer, without AFP 43.2 micrometer.

EXAMPLE VII

Example VI was repeated, but now the pre-frozen flakes are fed via an hopper to a twin screw extruder (CP1050, APV) which was cooled with a methanol solution at −28° C. Co-rotating fully intermeshing screw rotors were fitted and a rotational speed of 10 rpm was used. The ice-cream was compressed and extruded at a temperature of −12° C.

EXAMPLE VIII

A liquid premix for the preparation of ice-cream was prepared by mixing:

| Ingredient | % by weight |
| --- | --- |
| Skimmed milk powder | 10.00 |
| sucrose | 13.00 |
| maltodextrin (MD40) | 4.00 |
| Locust bean gum | 0.14 |
| butter oil | 12.00 |
| monoglyceride (palmitate) | 0.30 |
| vanillin | 0.01 |
| AFP* | 0.01 |
| water | balance |

*AFP is AFP of HPLC-12 as described in WO 97/02343.

The mix was aerated to 100% overrun as in example VI. The aerated mix was frozen in the form of 10 mm diameter pellets using a cryogenic freezing unit (British Oxygen Company). The freezing surface consisted of a rotating horizontal turntable, which was cooled using liquid nitrogen to a temperature of −100° C. The air above the freezing turntable was also cooled to a temperature of −120° C., The turntable was rotated at 5 rpm. After a single rotation the frozen pellets were swept off the freezing surface and collected.

The frozen pellets were then fed into a screw extruder under the same conditions as in Example VII.

The invention claimed is:

1. A process for the manufacture of a frozen food product comprising AFPs, wherein the process comprises:
    (i) a step of rapidly freezing a food composition comprising AFPs such that the product reaches a temperature of −5° C. or lower within 30 seconds; and
    (ii) a compaction step using a screw extruder or a compactor.

2. The process according to claim 1 wherein in step (i) the product is frozen to a temperature of −5° C. or lower in from 0.01 to 25 seconds.

3. The process according to claim 1 wherein in step (i) the product is frozen to a temperature of −5° C. or lower in from 1 to 15 seconds.

4. A process according claim 1 wherein step (i) involves one or more of:
    (a) surface freezing, onto a cold surface;
    (b) freezing of a supercooled system;
    (c) decompression freezing;
    (d) freezing at very low temperatures;
    (e) rapid particulate freezing.

5. A process according to claim 1, wherein step (i) involves drum freezing of the product.

6. A process according to claim 1, wherein in step (ii) a screw extruder is used.

7. A process according to claim 1, wherein in step (ii) the extrusion temperature of the frozen food product is less than −8° C.

8. A free-flowing, particulate food product comprising anti-freeze peptide, which maintains its free-flowing nature during storage, obtainable by rapidly freezing the food product such that the food product reaches a temperature of −5° C. or lower within 30 seconds.

9. The free-flowing, particulate food product according to claim 8, wherein the food product is rapidly frozen such that the food product reaches a temperature of −5° C. or lower in from 0.01 to 25 seconds.

10. The free-flowing, particulate food product according to claim 8 wherein the food product is rapidly frozen such that the food product reaches a temperature of −5° C. or lower in from 1 to 15 seconds.

11. A process according to claim 4, wherein in step (e), the rapid particulate freezing is condensation freezing.

* * * * *